Dec. 3, 1968  L. W. KESTING  3,414,217
THRUST AUGMENTATION AND SPIN STABILIZATION MECHANISM
FOR ROCKET PROPELLED MISSILES
Filed March 16, 1967  3 Sheets-Sheet 3

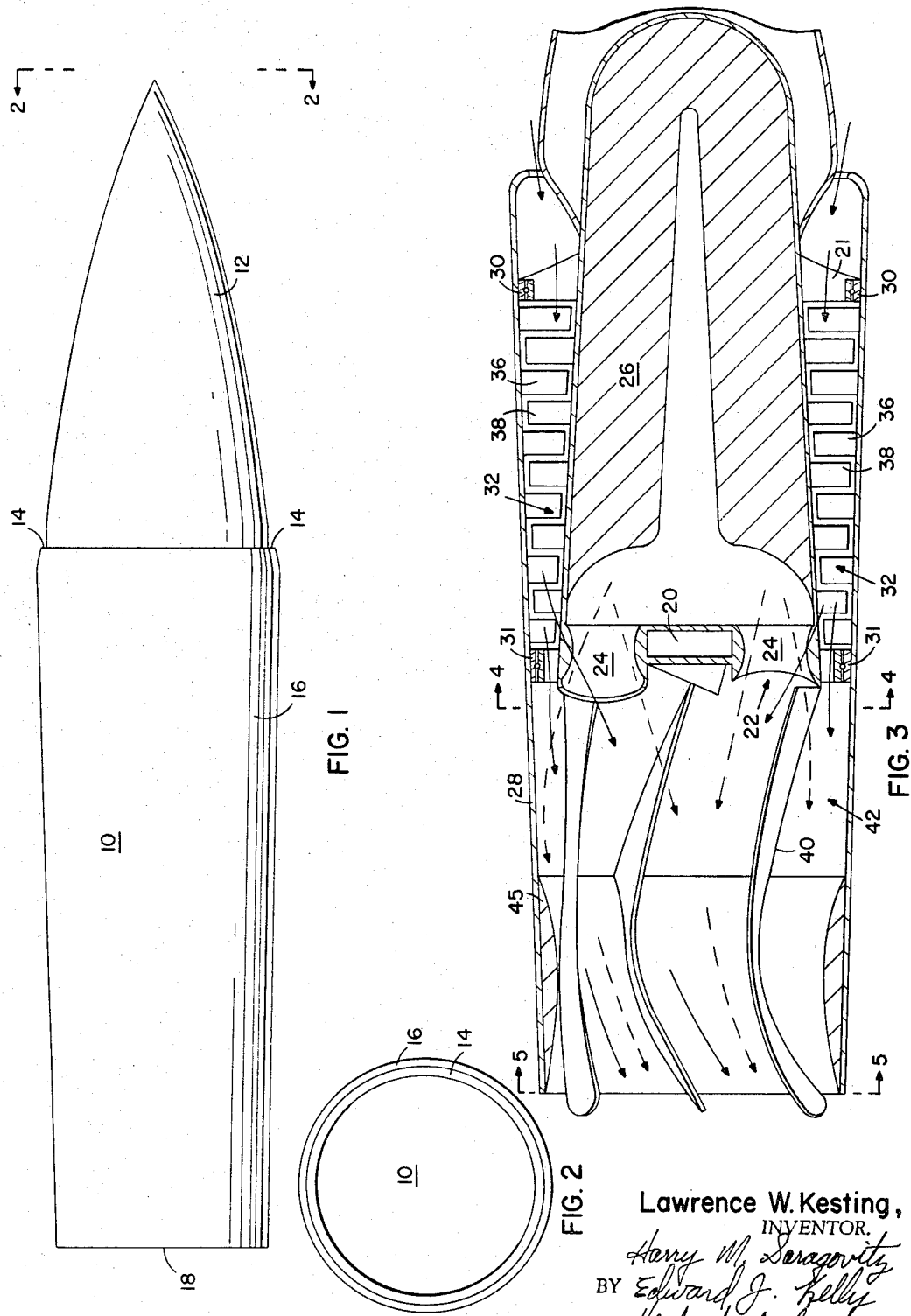

Lawrence W. Kesting
INVENTOR.

BY
Harry M. Saragovitz
Edward J. Kelly
Herbert Berl
Harold W. Hilton

United States Patent Office 3,414,217
Patented Dec. 3, 1968

3,414,217
THRUST AUGMENTATION AND SPIN STABILIZATION MECHANISM FOR ROCKET PROPELLED MISSILES
Lawrence W. Kesting, Huntsville, Ala., assignor to the United States of America as represented by the Secretary of the Army
Filed Mar. 16, 1967, Ser. No. 624,668
10 Claims. (Cl. 244—3.23)

ABSTRACT OF THE DISCLOSURE

A missile which utilizes the gas discharges from two sets of nozzles to augment the thrust of the missile and to produce counteracting torques which drive the rotor and blades of an air compressor. The discharge from a plurality of canted nozzles in the rocket motor is directed against vanes which are disposed in the combustion chamber and rigidly attached to the shroud of the missile. Air is admitted through a diffuser and is compressed by a compressor and directed to the combustion chamber to mix with the gaseous discharge to expand the mixture in the combustion chamber which is exhausted through a shroud nozzle containing a continuation of the vanes in the combustion chamber. The reaction on the canted nozzles in the rocket motor, the impulse on the vanes in the combustion chamber and the reaction on the vanes in the shroud nozzle produce counter torques which activate the air compressor which compresses the air flowing from the diffuser to the combustion chamber. In the combustion chamber, air is mixed with the combustion products from the solid propellant and is heated by these products and the combustion products are further oxidized by the air. This causes an expansion of the mixture in the combustion chamber which augments the thrust delivered by the rocket motor.

Background of the invention

This invention relates to mechanism for spinning a rocket or missile in flight for spin stabilization thereof while also augmenting the thrust of the missile. More particularly, the invention is concerned with providing such a spin stabilized missile with an improved system for fuel combustion in the exhaust section of reaction type engines as used in rockets or missiles and in which Mach number will be lowered at which air augmentation becomes effective.

Conventionally, air augmentation of rocket thrust is similar to the operation of a typical ramjet. Air is admitted through a diffuser and reduced to subsonic velocities. Exhaust gases from the rocket motor are mixed, and in some applications, burned in the air stream aft of the diffuser. The products are then discharged through a conventional ramjet nozzle. The heat added to the air increases thrust over that available from the rocket acting alone.

In conventional air augmentation techniques, it is required that high missile velocities be attained before the added thrust is realized. The diffuser increases the drag on the missile and at speeds below about Mach 1.2 the drag exceeds the added thrust. Thus, whether or not air augmentation can be advantageously used depends largely on diffuser capture area and trajectory range, speed and altitude. In many cases where air augmentation has been eliminated in trade off studies, it could be used to advantage if the velocity at which it becomes effective were lower.

Summary of the invention

It is, therefore, an object of the present invention to provide mechanism for thrust augmentation and spin stabilization of a rocket to overcome the above noted difficulties.

It is another object of the present invention to provide such thrust augmentation mechanism which will be effective at lower velocities of the missile than that of conventional air augmentation in missiles under current development.

It is a further object of the present invention to provide a mechanism for missiles wherein a pair of components are rotated relative to one another to overcome undesirable gyroscopic effects on the missile while augmenting the thrust thereof.

It is yet a further object of the present invention to provide such a thrust augmentation mechanism wherein gas discharges from two sets of nozzles are utilized to produce counteracting torques on the missile while augmenting the thrust thereof.

Other objects and advantages of the present invention will become more readily apparent from the following description taken in connection with the illustrative embodiments in the accompanying drawing.

Brief description of the drawing

FIGURE 1 is an elevational view of a rocket utilizing the principles of the present invention.

FIGURE 2 is a sectional view along line 2—2 of FIGURE 1.

FIGURE 3 is a fragmentary elevational sectional view of a missile illustrating the rocket motor, nozzles and air compressor.

Description of the preferred embodiments

Figure 4:
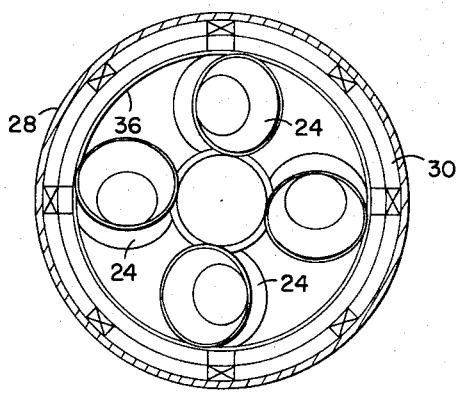
FIGURE 4 is a sectional view along line 4—4 of FIGURE 3 illustrating the canted nozzle.

As shown in FIGURE 1, a missile 10 includes a forebody or nose portion 12, an air intake 14, an aft body portion 16 including a shroud 28 and a shroud nozzle exit 18. An igniter 20 (FIGURE 3) is mounted adjacent a first nozzle assembly 22 having a plurality of canted nozzles 24 disposed in communication with a solid propellant motor 26 enclosed in a substantially cylindrical casing 34. Nozzles 24 eject the products of combustion responsive to ignition of the propellant by igniter 20.

The motor and nozzle assembly 22 are rotatably mounted in a substantially cylindrical missile shell casing or shroud 28 by means of bearings 30 and 31 secured between a plurality of support members 21 of the motor casing 34 and shroud 28.

An axial flow air compressor 32 is mounted in a chamber 21 between the outer periphery of the motor casing 34 and the interior of shroud 28. The compressor includes a plurality of compressor blades 36 (for example, the stator blades) which are attached to the shroud and the rotor blades 38 which are attached to the rocket motor. Chamber 21 includes a diffuser section 23 adjacent intake 14. Forebody 12 is rigidly secured to motor casing 34 adjacent the intake 14 of the diffuser.

Figure 5:
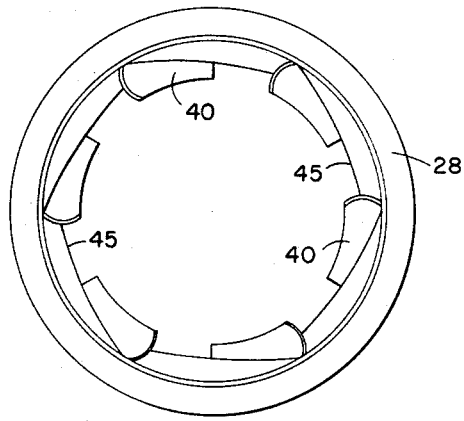
FIGURE 5 is a sectional view along line 5—5 of FIGURE 3 illustrating the canted vanes in the aft section of the rocket.

As shown in FIGURES 3 and 4, the plurality of nozzles 24 are concentrically disposed about the igniter and are inclined or canted to provide rotation of the motor and to direct the exhaust gases against a plurality of vanes 40 in the combustion chamber 42 of the rocket. As shown in FIGURES 3 and 5, the vanes are also curved and canted and are secured to the interior of combustion chamber 42. Each vane is provided with an extending portion 41 which extends into an aft section 43 of the shroud having a nozzle 45 therein. The vanes are canted at an angle at which exhaust gases from the burning propellant will impinge on the vanes to produce a rotation of the shroud opposite in direction to that of the rotating rocket motor to insure counter rotation between the rotor and stator blades of the axial flow air compressor 32.

In operation, igniter 20 is fired, by means well known in the art, to ignite solid propellant 26, which burns, and gases (shown as dashed arrows in the drawings) which may or may not be fuel rich are discharged through canted nozzles 24. Discharge through the canted nozzles causes the motor and forebody to rotate. The gaseous discharge impinges on vanes 40 in combustion chamber 42 and causes shroud 28 to rotate opposite in direction to rocket motor 26. This relative rotation activates axial flow air compressor 32 which receives air from intake 14. (Air flow is shown by solid arrows in the drawing.) Compressed air is discharged in the combustion chamber and is mixed with gases from the rocket motor. The air is heated by the gases and the gases are further oxidized by the air. This causes a considerable expansion of the mixture which is discharged through the aft shroud nozzle 45 to the atmosphere. During discharge, the exhaust causes a reaction on that extending portion 41 of the curved vanes 40 in the aft section of the shroud and this reaction adds to the torque on air compressor 32. At this time, the missile is moving through the atmosphere, air is captured by the intake and is reduced in velocity in diffuser 23 to cause a pressure rise at the entrance of compressor 32 which is carried through to the combustion chamber 42. The mixture of hot gases from the rocket motor and the compressed air augments the thrust from the rocket when discharged through shroud nozzle 45.

Quite obviously, many variations of the invention may become apparent to one skilled in the art. Since the rotation between the rotor and stator blades need only be relative, combinations of shroud, rocket motor, and forebody stabilizations and rotations are possible.

For example, in the embodiment shown in FIGURES 1-5, with the rocket rotor and forebody rigidly attached as shown: (a) the shroud may be made to rotate in the opposite direction to the motor and forebody as a result of impulse-reaction on the canted vanes, as discussed, supra; (b) the rocket motor and forebody may be held non-rotating in flight by fins and/or a counter torque from the motor nozzles and the shroud rotates as a result of impulse and reaction on the curved vanes, and; (c) the shroud may be held non-rotating by fins and/or a counter torque from the shroud nozzle.

Figure 6:
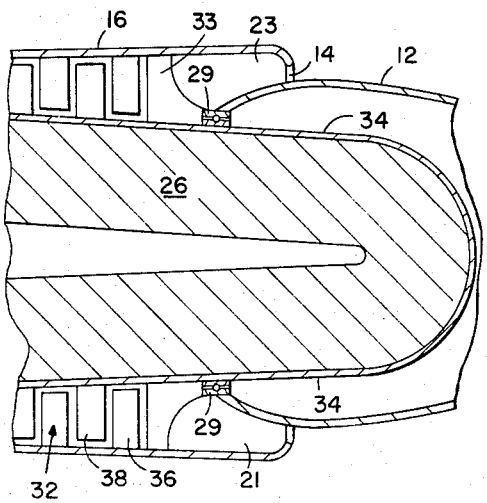
FIGURE 6 is a fragmentary sectional view of an embodiment of my invention with thrust bearings between the rocket motor and forebody for relative rotation therebetween.

Other combinations are possible, for example, as seen from FIGURE 6 wherein the the shroud and forebody are rigidly attached at 33 and the motor it attached to the forebody through thrust bearings 29; (a) the shroud and forebody may be held non-rotating by fins and/or counter torque from the impulse-reaction on the curved vanes and the motor rotates as a result of the canted nozzle reaction; (b) the motor rotates as a result of the canted nozzle reaction while impulse-reaction on the curved vanes rotates the shroud and forebody oppositely from the motor rotation; (c) the motor is held non-rotating by reaction from the motor nozzles that balances friction in the bearings between the motor and shroud and motor and forebody.

Figure 7:
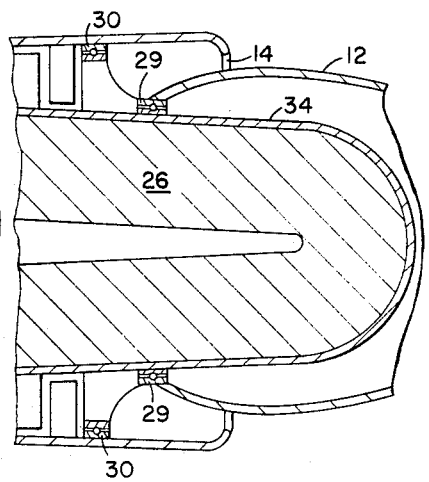
FIGURE 7 is a view similar to FIGURE 6 with thrust bearings between the rocket motor, forebody, and outer casing for relative rotation therebetween.

FIGURE 7 illustrates another variation where the shroud and the forebody are joined by thrust bearings 30 and the motor and forebody are joined by the thrust bearings 29 so that each component is free to rotate relative to the others.

Figure 8:
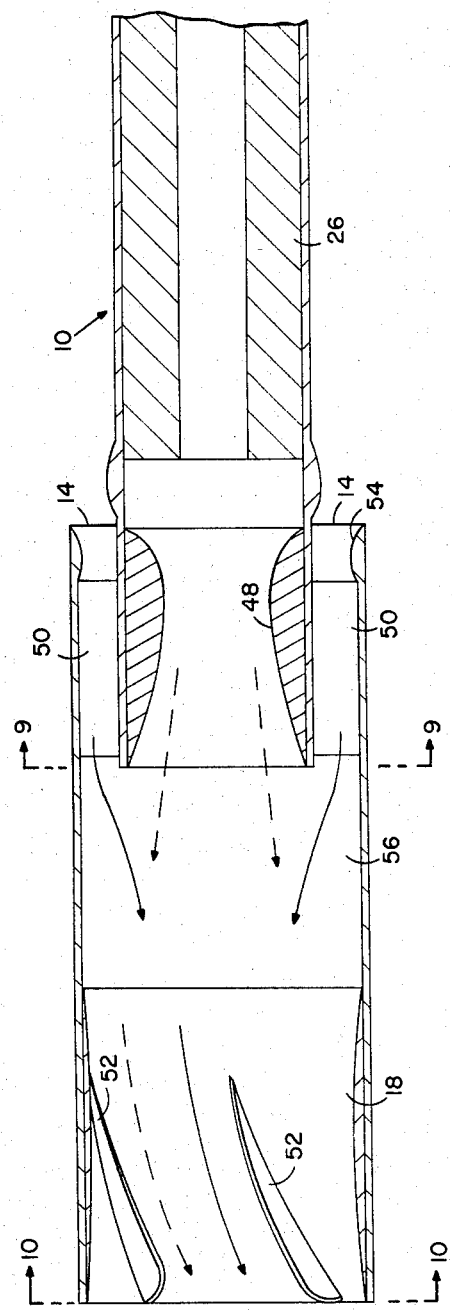
FIGURE 8 is an elevational sectional view of another embodiment of my invention.

Another embodiment of my invention is illustrated in FIGURE 8 wherein like numerals refer to like parts. In this embodiment, a single nozzle exhausts gases against vanes in the shroud nozzle and spins the entire missile.

As shown in FIGURE 8, the missile 10 includes an air intake 14, a shroud 16, a shroud nozzles exit 18, and a solid propellant motor 26.

A single nozzle 48 is disposed in communication with solid propellant motor 26 to carry away the products of combustion responsive to ignition of the propellant by an igniter, not shown.

Figure 9:
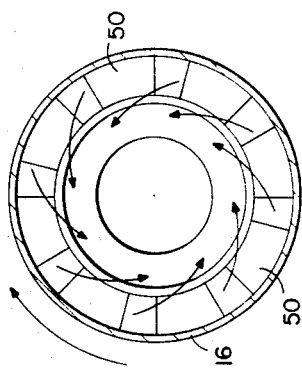
FIGURE 9 is a sectional view along line 9—9 of FIGURE 8.
Figure 10:
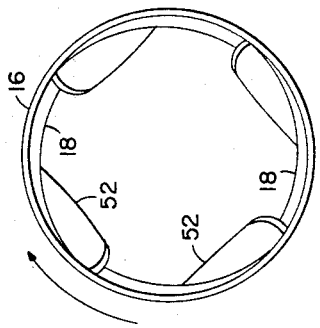
FIGURE 10 is a sectional view along line 10—10 of FIGURE 8.

A pluraliy of canted compressor blades 50 (FIGURES 8 and 9) is rigidly secured to the casing of motor 26 and shroud 16 and a plurality of canted vanes 52 (FIGURES 8 and 10) is secured in the shroud nozzle 18. Air intake 14 includes a diffuser 54 at the forward portion of shroud 16.

In the operation of this embodiment, an igniter (not shown) is fired to activate solid propellant motor 26. Combustion products are discharged through the nozzle 48 into the combustion chamber 56 and then through the shroud nozzle 18 to the atmosphere (shown as dashed arrows). In passing through shroud nozzle 48, the combustion products impinge upon vanes 52 and, due to the rigid attachment of the vanes to the shroud and the shroud to the casing of motor 26 by blades 50, the entire missile is made to spin. Thrust is also imparted to the missile by discharge through shroud nozzle 18. The missile, is, therefore, spun and propelled through the atmosphere. Air is admitted through the air intake 14 and compressed by diffuser 54 (shown as solid arrows). The compressed air is then further compressed by canted compressor blades 50 which are rigidly attached to the shroud and rocket motor. The compressed air is then discharged to the combustion chamber 56 and mixed with combustion products from the solid propellant. The air is heated by these products and the products are further oxidized by the air. This causes an expansion of the mixture in the combustion chamber which augments the thrust delivered by the rocket motor.

In this embodiment of my invention, the discharge from solid propellant nozzle 48 produces no torque. However, torque is produced by a reaction on the canted blades secured in the shroud nozzle and the torque action on the shroud nozzle spins the entire missile for stabilization thereof and compression of intake air. The canted blades aft on the air intake compresses the air before it enters the combustion chamber. Thus, by burning higher pressure air, thrust is increased and Mach number is lowered for a net gain in thrust.

It is to be understood that the foregoing drawing and description are for illustrative purposes only and are not to be taken in the limiting sense and that obvious modifications may occur to one skilled in the art, but such modifications are within the scope of the appended claims.

I claim:

1. An air augmented, spin stabilized missile comprising:
(a) a body including a nose portion, a first substantially cylindrical casing extending rearwardly of said nose portion for enclosing a propellant charge and provided with a first nozzle assembly for ejecting thrust producing gases from said propellant charge therethrough; and, a second substantially cylindrical casing enclosing an afterburner section disposed for receiving said gases from said first nozzle assembly therein and a second nozzle assembly in communication with said afterburner section and the atmosphere for passage of said thrust producing gases thereto;
(b) air inlet means defining an annular chamber between said casings disposed to receive air from the atmosphere and for directing said air to said afterburner section for mixing with said gases therein;

(c) air compressor means including a plurality of canted blades mounted in said annular chamber for compressing said air for further expansion of said gases in said afterburner section prior to ejection of said gases through said exhaust nozzle to augment the thrust produced thereby;

(d) means secured to the interior of said second casing for impingement thereagainst by said gases expelled from said first nozzle assembly to impart spin to said body for rotating said body and said compressor blades for compressing said air entering said afterburner section and for rotating said missile for spin stabilization thereof.

2. A missile as in claim 1 wherein said means secured to the interior of said second casing includes a plurality of canted vanes.

3. A missile as in claim 1 including a diffuser disposed in said air inlet to reduce the velocity of air entering said inlet.

4. A missile as in claim 1 including means for securing said nose portion, said first cylindrical casing and said second cylindrical casing together for relative rotation therebetween.

5. A missile as in claim 4 wherein said first nozzle assembly includes a plurality of nozzles arranged in an annulus and in canted relation for rotating said first cylindrical portion responsive to reaction from the ejected gases through said plurality of canted nozzles.

6. A missile as in claim 5 wherein said compressor includes rotor and stator blades secured between said first and second cylindrical casings and said vanes are mounted in said second casing and canted at an angle with the longitudinal axis of said second casing whereby the reaction of expelled gases on said canted nozzles and the impulse of the expelled gases on said vanes produce counter torques, for activating said compressor and spin stabilizing said missile.

7. A missile as in claim 6 wherein said first casing is rigidly secured to said nose portion and said second casing disposed concentrically about said first casing, bearing means secured between said second casing and said first casing for rotation of said second casing relative to said first casing responsive to ejection of said gases through said plurality of canted nozzles and impingement thereof against said vanes.

8. A missile as in claim 4 whereby said means for securing said nose portion, said first cylindrical casing and said second cylindrical casing together for the relative rotation includes a bearing assembly secured to said nose portion and said first cylindrical casing, a second bearing assembly secured to said first cylindrical casing and said second cylindrical casing at the forward portion thereof, and a third bearing assembly secured to said first cylindrical casing and said second cylindrical casing adjacent the rearward portion of said first cylindrical casing.

9. A missile as in claim 2 wherein said second nozzle assembly includes a single nozzle for expelling said gases into said afterburner section and against said vanes.

10. A missile as in claim 9 wherein said compressor blades are rigidly secured to said first casing and said second casing and wherein said impingement of gases against said vanes provide rotation to the entire missile body, whereby air entering said inlet is compressed by said canted blades and said missile is spin stabilized in flight.

References Cited

UNITED STATES PATENTS

| | | | |
|---|---|---|---|
| 2,395,114 | 2/1946 | Goddard | 60—201 |
| 2,500,537 | 3/1950 | Goddard | 60—201 |
| 2,610,646 | 9/1952 | Knoll | 60—259 |
| 2,831,320 | 4/1958 | Duncan | 60—201 |
| 3,049,883 | 8/1962 | Sloan | 60—270 X |

SAMUEL FEINBERG, SR., *Primary Examiner.*

VERLIN R. PENDEGRASS, *Assistant Examiner.*